Patented Nov. 10, 1931

1,831,673

UNITED STATES PATENT OFFICE

OTTO LIEBKNECHT, OF BERLIN-GRUNEWALD, GERMANY

ADSORBENT AGENT AND PROCESS FOR MAKING THE SAME

No Drawing. Application filed July 21, 1927, Serial No. 207,559, and in Germany July 30, 1926.

The present invention refers to adsorbent agents for certain substances from liquids (decolorizing) or gases or vapors and the process for making the same agents.

The adsorbent agents may be used for recovering vaporized solvents, enriching or concentrating gases or vapors, especially of organic nature, and decolorizing or deodorizing liquids.

The adsorbing agents, according to the present invention, consist of silicic acid gels obtained from silicic acid sols in the presence of electrolytes.

A species of the said adsorbing agents has the structure of substances having the constitution of zeolites and deprived of the basic substances of the said zeolites.

By zeolites I mean natural or artificial zeolites (aluminatesilicates), and the so called natural zeolites or artificial zeolitic substances, as the various reaction products of water soluble silicates or alminates, or iron compounds, glauconite, green sand, tuffs, glasses, as they may be selected by mechanical means from tuffs or as they are produced in the manufacture of zeolitic substances by melting operations.

The adsorbing agents consist of the zeolites which are deprived completely or partially of the basic constituents (alkaline, earth alkaline, heavy metal oxides).

A modification of the adsorbing agents according to the invention consists of those zeolites, which are not only deprived of the basic constituents, but also of the metallic acid constituent present in addition to silicic acid, as in the case of aluminate silicates, of alumina having acid function, or in the case of ironate silicate of iron oxide having acid function.

The degree in which the basic or acid substances are lacking depends on the desired degree of adsorbing action or the velocity of the action and the time of its duration. If one wishes to have a fast, readily and long time acting adsorbing agent, the basic or (and) acid substances must be absent or removed completely.

The process of manufacturing the adsorbing agents consists in treating the zeolites, which may be heated before the treatment to temperatures above 100 degrees centigrade in order to stabilize them (as especially in the case of minerals, as glauconite) with water soluble substances having acid function. Such substances are inorganic or organic acids, acid salts, salts which split off by hydrolysis acids. Suitable substances of the said kind are, for instance, hydrochloric acid, sulphuric acid, phosphoric acid, formic acid, acetic acid, oxalic acid, lactic acid, butyric acid, the various fatty acids, ammonium salts of the said acids, alkaline (sodium) bisulfate, ferric or ferrous chloride, ferrous or ferric sulfate, iron acetate, aluminium chloride, aluminium sulfate, the various alums, phenols in the case of readily decomposable zeolites or zeolitic substances and also carbonic acid. The acid may be dissolved in water or may be liquid by nature or may be gaseous, as hydrochloric acid, sulfur dioxide, acetic acid, or formic acid. The selection of the said acid substances is made according to the difficulty or facility of decomposition of zeolitic materials or the price of the acid substances.

Generally one uses acid substances reacting with the basic or acid constituents so that by their action soluble substances will be formed. One may however also use substances which form insoluble salts with the basic or acid constituents split off from the zeolitic material. For instance, one may use in the case of a calciumzeolite, hydrochloric, phosphoric, or sulfuric acid.

The concentration of the acid acting substances is preferably so chosen that the resulting material deprived of the constituents in question will have the physical or mechanical structure suitable for the desired purpose, as decolorizing liquids or adsorbing gases or vapors. For the latter purpose one prefers generally sticky masses, whereas for treating liquids, pulverous materials may be suitable. If powders result from the treatment of the zeolitic materials, one may press them by suitable pressure, with or without a binding substance (inorganic or organic, for instance resins, gypsum, cement), into agglomerates of suitable form, as for instance globules or briquettes. In the selection of the binding agent one lays weight on preserving the activity of the product. Injurious substances are removed by washing out with water or aqueous solutions of salts or acids, which may have chemical action. If a binding agent such as water glass has been used one treats the agglomerates with a suitable acid, as sulfuric or hydrochloric acid, in order to remove the introduced alkali or to make it innoxious in the subsequent adsorption. One may use for the depriving of the bases, substances which react with the other components of the zeolitic material under formation of insoluble compounds, for instance iron compounds. In many cases as in the decolorizing or in the adsorption of indifferent gases or vapors the formed compounds do not interfere with the adsorption. In other cases, for instance if the vapors or gases to be adsorbed have acid or basic nature one may extract the elements entered into the zeolites molecule before the employment for adsorption by causing acid substances dissolving the iron (or other metal) to react on the compounds. One may extract the metal completely or partially.

The extraction of the basic constituents, the metal acids or the metal combined with the zeolites material may be effected by a single one of the acid substances, quoted above as examples, or by several acid substances, either in mixture with each other or one after the other. For instance one may use phosphoric acid and sulfuric acid or phosphoric acid and hydrochloric acid in mixture with each other or one after the other. One may for instance use ferric or ferrous sulfate with sulfuric acid or ferric or ferrous chloride with hydrochloric acid, either in mixture or one after the other.

*Example 1.*—100 kg. of natural or artificial (synthetic) zeolitic (tuff, natural or artificial, i. e. synthetic, zeolitic glasses, glauconite in natural or by heating to about 300–800 degrees centigrade stabilized state), containing about 5.6% $Na_2O$ are extracted with 360 kg. hydrochloric acid, of 1.83% HCl, or 600 kg. of hydrochloric acid of the same strength or with 960 kg. sulfuric acid of 1.005 specific gravity or with 640 kg. phosphoric acid solution of 1% or with 800 kg. acetic acid or with 1200 kilogrammes sodiumbisulfate in an aqueous solution of 1%, or with 1100 kilogrammes ferric chloride in an aqueous solution of 10%, at ordinary temperature or a higher temperature up to the boiling point of the solution in question so long until a sufficient amount of basic constituents has been extracted. Whether or not the extracted amount is sufficient, may be determined, by using a sample of the residue, which may be washed with water until the removal of the used reagent, for the purpose, of determining for instance, if the decolorizing of liquids (for instance impure sugar solutions or oils) or the adsorption of gases or vapors from air is sufficiently effected by the material. In the extraction the zeolite or the zeolitic material may be used in granular or pulverous form. The extraction may be executed at ordinary, diminished or raised pressure, e. g. at a vacuum of about 760 mm. or a pressure of 2 atmospheres. The temperature or (and) the pressure may be constant or may be varied during the extraction e. g. one may first extract at ordinary temperature and then heat to 80–100 degrees centigrade or inversely. One may treat at ordinary pressure at first and then under diminished pressure; or, inversely; or, one treats at first at ordinary pressure, then under higher pressure and finally under diminished pressure. In case it is intended that the metallic acid component, as alumina, should also be extracted one uses a higher amount of acid acting substances than is required if one desires only to extract the basic components from the zeolitic material.

In the case that, for the extraction of the basic constituents a salt of a metal, for instance ferric chloride or ferric sulfate, has been used, and the removal of the metal from the adsorbent agent is desired, one extracts the residue, as obtained in the above described example, with 100 kilogrammes hydrochloric acid of 6.6% HCl at ordinary or higher temperature, for instance at 50–100 degrees centigrade, at ordinary, diminished (vacuum) or raised pressure e. g. under 2 atmospheres.

After the treatment one may wash the material with water or with solutions of any salts (e. g. sodium or ammoniumchloride) or with both one after the other. The liquid may be of ordinary or higher temperature. The washing may also be omitted. The washed material may be used immediately, for instance for decolorizing aqueous solutions. After a drying it is especially suitable for the treatment of gases or vapors and also of aqueous liquid.

In all cases the zeolitic material may be heated before the extraction, for instance to 300–800 degrees centigrade, which treatment is especially suitable for natural materials, as natural zeolitic or glauconite.

*Example 2.*—400 kg. of artificial base-exchanging sodium-aluminum silicate for instance in the state as used for softening water, or in coarser or finer state are mixed with 700 kilogrammes water of about 50–100 degrees centrigrade and now hydrochloric acid of sp. gr. 1.12 or higher percentage (for instance crude hydrochloric acid) or diluted hydrochloric acid is gradually added until even after prolonged heating, congopaper becomes blue, an indication that free hydrochloric acid is in the liquid. One allows it to settle, draws off the liquid, containing sodium chloride, aluminiumchloride and small amounts of ferric chloride, and washes the residue with water until the removal of the salts, which may be effected by repeated mixing and settling with water containing hydrochloric acid. The final resulting material may contain hydrochloric acid and is finally dried at about 170 degrees centigrade.

The material is a very active silicic acid, well adapted for adsorbing benzol vapors or the like from air.

By suitably selecting the size of the zeolitic material one obtains adsorbent agents of the desired size, because the silicic acid maintains the volume and size of the zeolitic material.

In the place of artificial base-exchanging sodium-aluminum silicate, the raw product of the manufacture, i. e. the fused mass or other double silicates may also be used in suitable gradation.

*Example 3.*—In Example 2 one may used the hydrochloric acid only in such amounts that blue litmus is colored red. In this case all alkali metal of the zeolitic material is dissolved in the form of sodiumchloride.

By properly selecting the amount of the acid substances one may also extract the metallic acid acting substances from the zeolitic material, as alumina and (or) iron oxide. Such material is especially adapted for decolorizing liquids, as so called bleaching earths, fullers earth etc.

In the place of artificial base-exchanging sodium-aluminum silicate, the other materials named in Example 2 may be used.

In Examples 2 and 3 the hydrochloric acid may be substituted for by other organic or inorganic acids, for instance by sulfuric acid, in which case the treated material must be washed completely until the removal of the acid. The liquid coloring congo blue, separated from the undissolved (adsorbent agent) may be employed for the manufacture of alum, alumina, cryolithe.

I claim:—

1. A method for making adsorbent agents for adsorbing dissolved, gaseous or vaporized substances, which consists in adding acid reacting substances to zeolitic substances, treating the zeolitic substances with said acid reacting substances until at least a part of the hydrochloric acid soluble constituents of the zeolitic substances is dissolved, and separating the insoluble solid residue from the liquid.

2. A method for making adsorbent agents for adsorbing dissolved, gaseous or vaporized substances, which consists in adding aqueous solutions of acid reacting substances to zeolitic substances, treating the zeolitic substances with said aqueous solutions of acid reacting substances until at least a part of the hydrochloric acid soluble constituents of the zeolitic substances is dissolved, and separating the insoluble solid residue from the liquid.

3. A method for making adsorbent agents for adsorbing dissolved, gaseous or vaporized substances, which consists in adding aqueous solutions of acid reacting metal salts to zeolitic substances, treating the zeolitic substances with said aqueous solutions of acid reacting metal salts until at least a part of the hydrochloric acid soluble constituents of the zeolitic substances is dissolved, and separating the insoluble solid residue from the liquid.

4. A method for making adsorbent agents for adsorbing dissolved, gaseous or vaporized substances which consists in adding aqueous solutions of acid reacting metal salts to zeolitic substances, treating the zeolitic substances with said aqueous solutions of acid reacting metal salts until at least a part of the hydrochloric acid soluble constituents of the zeolitic substances is dissolved, separating the insoluble solid residue from the liquid and extracting, with acids, the metal oxide which entered the zeolitic compound during the treatment with said aqueous solutions of acid reacting metal salts.

5. A method for making adsorbent agents for adsorbing dissolved, gaseous or vaporized substances which consists in adding acid reacting substances to zeolitic substances, suspended in water, treating the zeolitic substances with said acid reacting substances until at least a part of the hydrochloric acid soluble constituents of the zeolitic substances is dissolved, and separating the insoluble solid residue from the liquid.

6. A method for making adsorbent agents for adsorbing dissolved, gaseous or vaporized substances which consists in adding aqueous solutions of acid reacting substances to zeolitic substances, suspended in water, treating the zeolitic substances with said aqueous solutions of acid reacting substances until at least a part of the hydrochloric acid soluble constituents of the zeolitic substances is dissolved, and separating the insoluble solid residue from the liquid.

7. A method for making adsorbent agents for adsorbing dissolved, gaseous or vaporized substances which consists in adding aqueous solutions of acid reacting metal salts to zeolitic substances, suspended in water, treating the zeolitic substances with said aqueous solutions of acid reacting metal salts until at least a part of the hydrochloric acid soluble constituents of the zeolitic substances is dissolved, and separating the insoluble solid residue from the liquid.

8. A method for making adsorbent agents for adsorbing dissolved, gaseous or vaporized substances which consists in adding aqueous solutions of acid reacting metal salts to zeolitic substances, suspended in water, treating the zeolitic substances with said aqueous solutions of acid reacting metal salts until at least a part of the hydrochloric acid soluble constituents of the zeolitic substances is dissolved, separating the insoluble solid residue from the liquid, and extracting, with acids, the metal oxide which entered the zeolitic compound during the treatment with said aqueous solutions of acid reacting metal salts.

9. A method for making adsorbent agents for adsorbing dissolved, gaseous or vaporized substances which consists in adding acid reacting substances to zeolitic substances, treating the zeolitic substances with said acid reacting substances until all the hydrochloric acid soluble constituents of the zeolitic substances are dissolved, and separating the insoluble, solid residue from the liquid.

10. A method for making adsorbent agents for adsorbing dissolved, gaseous or vaporized substances which consists in adding aqueous solutions of acid reacting substances to zeolitic substances, treating the zeolitic substances with said aqueous solutions of acid reacting substances until all the hydrochloric acid soluble constituents of the zeolitic substances are dissolved, and separating the insoluble, solid residue from the liquid.

11. A method according to claim 10 in which aqueous solutions of acid reacting metal salts are used for treating the zeolitic substances.

12. A method according to claim 10 in which aqueous solutions of acid reacting metal salts are used for treating the zeolitic substances, and in which the metal oxide, which entered the zeolitic compound during the treatment with said aqueous solutions of acid reacting metal salts, is extracted with acids.

13. A method according to claim 10 in which the aqueous solutions of acid reacting substances are added to zeolitic substances suspended in water.

14. A method according to claim 10 in which the aqueous solutions of acid reacting metal salts are added to zeolitic substances suspended in water.

15. A method according to claim 10 in which the aqueous solutions of acid reacting metal salts are added to zeolitic substances suspended in water and in which the metal oxide, which entered the zeolitic compound during the treatment with said aqueous solutions of acid reacting metal salts, is extracted with acids.

In testimony whereof I hereunto affix my signature.

OTTO LIEBKNECHT.